United States Patent [19]

Noda

[11] Patent Number: 4,890,306
[45] Date of Patent: Dec. 26, 1989

[54] TOOL HOLDER FOR MONITORING TOOL SERVICE TIME

[75] Inventor: Shigeo Noda, Nagoya, Japan

[73] Assignee: Toyoda Machine Works, Ltd., Kariya, Japan

[21] Appl. No.: 167,918

[22] Filed: Mar. 14, 1988

[30] Foreign Application Priority Data

Mar. 30, 1987 [JP] Japan .................................. 62-77159

[51] Int. Cl.[4] .......................... B23Q 3/15; B23B 49/00; G06M 3/06
[52] U.S. Cl. ......................................... 377/15; 377/16; 377/20; 409/234; 408/6; 408/16; 29/568
[58] Field of Search .................... 377/15, 16, 20, 24.1; 408/6, 16; 409/234; 29/568

[56] References Cited

U.S. PATENT DOCUMENTS

| | | | |
|---|---|---|---|
| 4,237,371 | 12/1980 | Le Bouder | 377/16 |
| 4,389,709 | 6/1983 | Knibiehler et al. | 377/16 |
| 4,395,624 | 7/1983 | Wartski | 377/15 |
| 4,399,548 | 8/1983 | Castleberry | 377/16 |
| 4,501,005 | 2/1985 | Miller | 377/20 |
| 4,588,339 | 5/1986 | Bilz | 409/234 |
| 4,702,650 | 10/1987 | Golwas et al. | 408/6 |
| 4,773,800 | 9/1988 | Furuhashi et al. | 409/234 |

FOREIGN PATENT DOCUMENTS 60-213453 10/1985 Japan .

*Primary Examiner*—John S. Heyman
*Attorney, Agent, or Firm*—Oblon, Spivak, McClelland, Maier & Neustadt

[57] ABSTRACT

A tool holder for monitoring the service time of a tool holded on the tool holder is disclosed. A sensor and electric circuit are provided for determining whether or not the machining operation with the tool is executed. Counters are provided for counting time cumulatively during the time when the machining operation is executed, and store the cumulative time as the service time of the tool. The service time is output to a numerical control apparatus via an output device.

4 Claims, 6 Drawing Sheets

TOOL HOLDER FOR MONITORING TOOL SERVICE TIME

BACKGROUND OF THE INVENTION

1. Field of the Invention

The present invention relates in general to a tool holder suitable for use on a machine tool, and more particularly to such a tool holder which is capable of monitoring tool service time.

2. Description of the Prior Art

Generally, a machine tool referred to as a machining center stores a large number of tools in the magazine and transfers a desired tool to the spindle selectively during the machining operation so as to carry out various machining operations with a single machine tool. In such machine tool, the number of the tools controlled in a single machine tool increases as the machining operations become more complex.

In addition, it is necessary to attach a different identification number to each tool and to read out the identification number so as to select a desired tool automatically. Furthermore, it is necessary to monitor the actual service time and lifetime of each tool because each tool has a limit as to service time due to wear of the tool.

For detecting the identification number and the lifetime from the tool holder, a memory device for storing the identification number and the lifetime can be provided on the tool holder.

On the other hand, the service time of each tool is cumulatively counted by a CPU in a numerical control apparatus. Namely, when one tool is selected, the CPU reads out the present service time from the memory device in the numerical control apparatus and counts or records the time during which a machining operation with a selected tool is carried out according to the machining command in a numerical control program. Thereafter, the CPU adds the counted or recorded time to the readout of service time and stores the renewed service time into the memory in the numerical control apparatus.

In the above described control apparatus, the burden of the CPU in the numerical control apparatus becomes relatively large because of the calculation of the service time.

It is also necessary to store a complex software program for monitoring the service time in the numerical control apparatus.

Moreover, it is difficult to monitor the service time of each tool in the machine tool, which is not provided with the numerical control apparatus, because the monitoring process of the service time is executed by the software program stored in the numerical control apparatus.

SUMMARY OF THE INVENTION

It is, therefore, an object of the present invention to provide an improved tool holder which is capable of monitoring the service time of a tool.

Another object of the present invention is to provide an improved tool holder capable of detecting machining operations and counting or recording time cumulatively during the time when the machining operations are executed.

Briefly, according to the present invention, these and other objects are achieved by providing a tool holder, as mentioned below. The sensor for detecting whether or not a machining operation is executed is provided in the body of the tool holder. When the output of the sensor indicates that the machining operation is executed, counter means count the cumulative time and memorize the cumulative time as a service time. The data of the service time is output to an outside control circuit by output means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
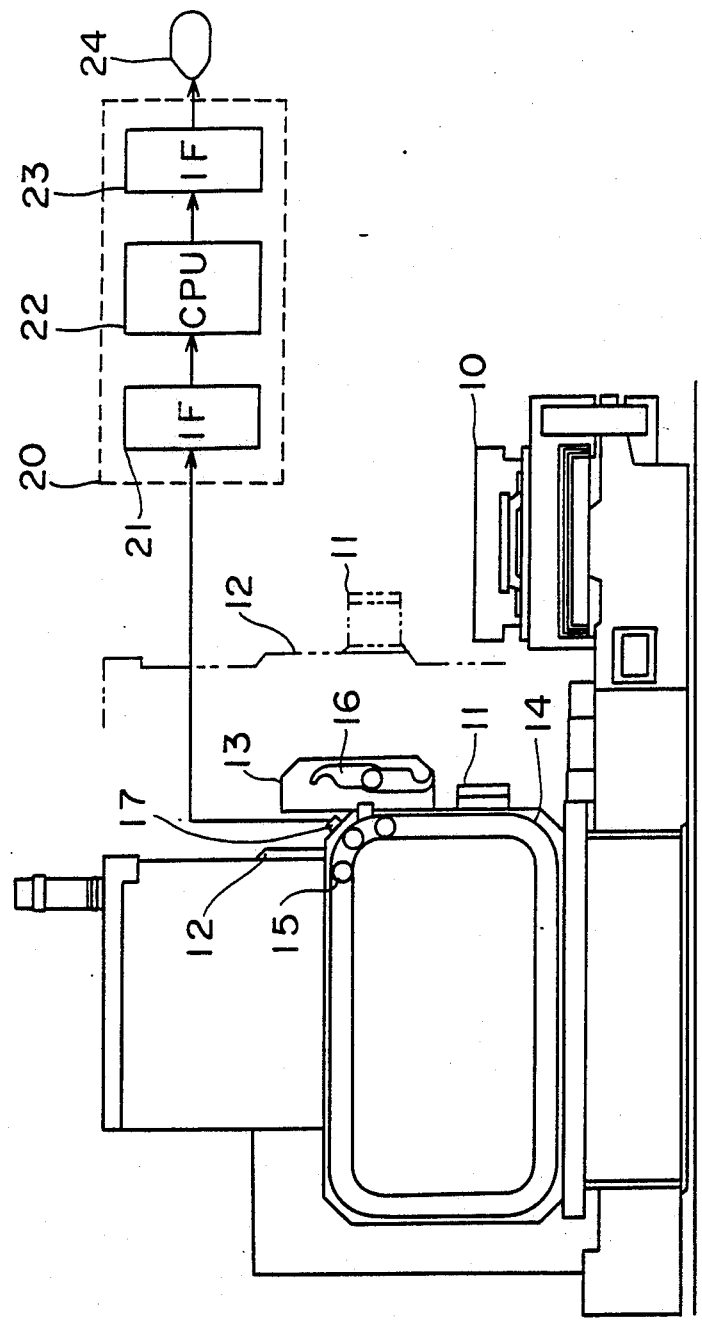
FIG. 1 is a side view of a machine tool with an automatic tool change apparatus.

Referring now to the drawings, and more particularly to FIG. 1, there is shown a tool magazine 14 in which a large number of tools 15 are stored. The tools 15 are selectively transferred to a spindle 11, which is rotatably supported in a spindle head 12 by an exchange arm 16 of an automatic tool change apparatus 13. The spindle head 12 is supported so as to be moved to and away from a worktable 10. The tool magazine 14 is indexable so that the tools 15 stored in the magazine 14 are successively moved to a tool exchange position. A readout head 17 is provided at the tool exchange position in order to readout the tool service time from the tools 15. The readout head 17 is connected to a numerical control apparatus 20, thereby the tool service times are read out by the numerical control apparatus 20.

Figure 2:
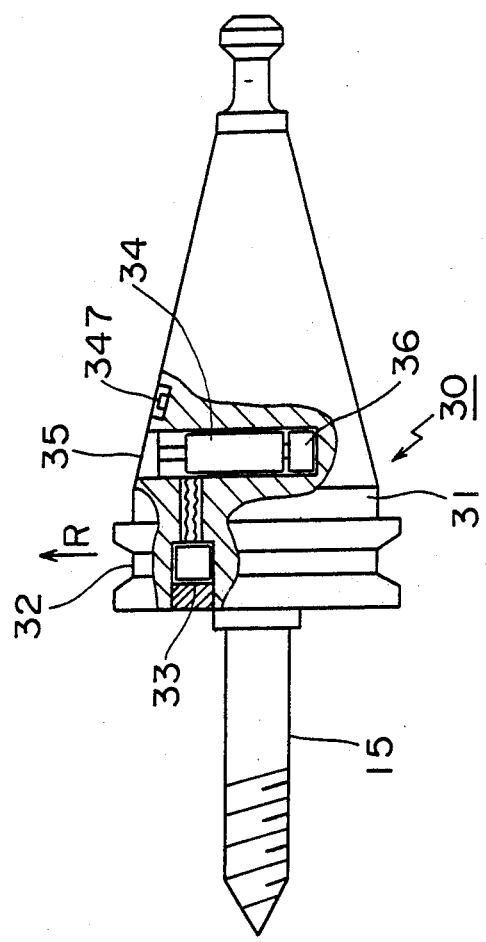
FIG. 2 is a partial sectional view of a tool holder according to the present invention.

Each tool 15 is secured to the body 31 of a tool holder 30 as shown in FIG. 2. The body 31 is conically shaped and a groove 32, on which the exchange arm 16 engages, is formed on the periphery of an end portion of the body 31. The tool 15 is secured at the center of the end portion. In the body 31, there are provided an acceleration sensor 33 for detecting acceleration along a normal direction R (centrifugal force), a control circuit 34 for counting or recording service time cumulatively and for memorizing the cumulative service time, an output head 35 and a battery 36.

Figure 3:
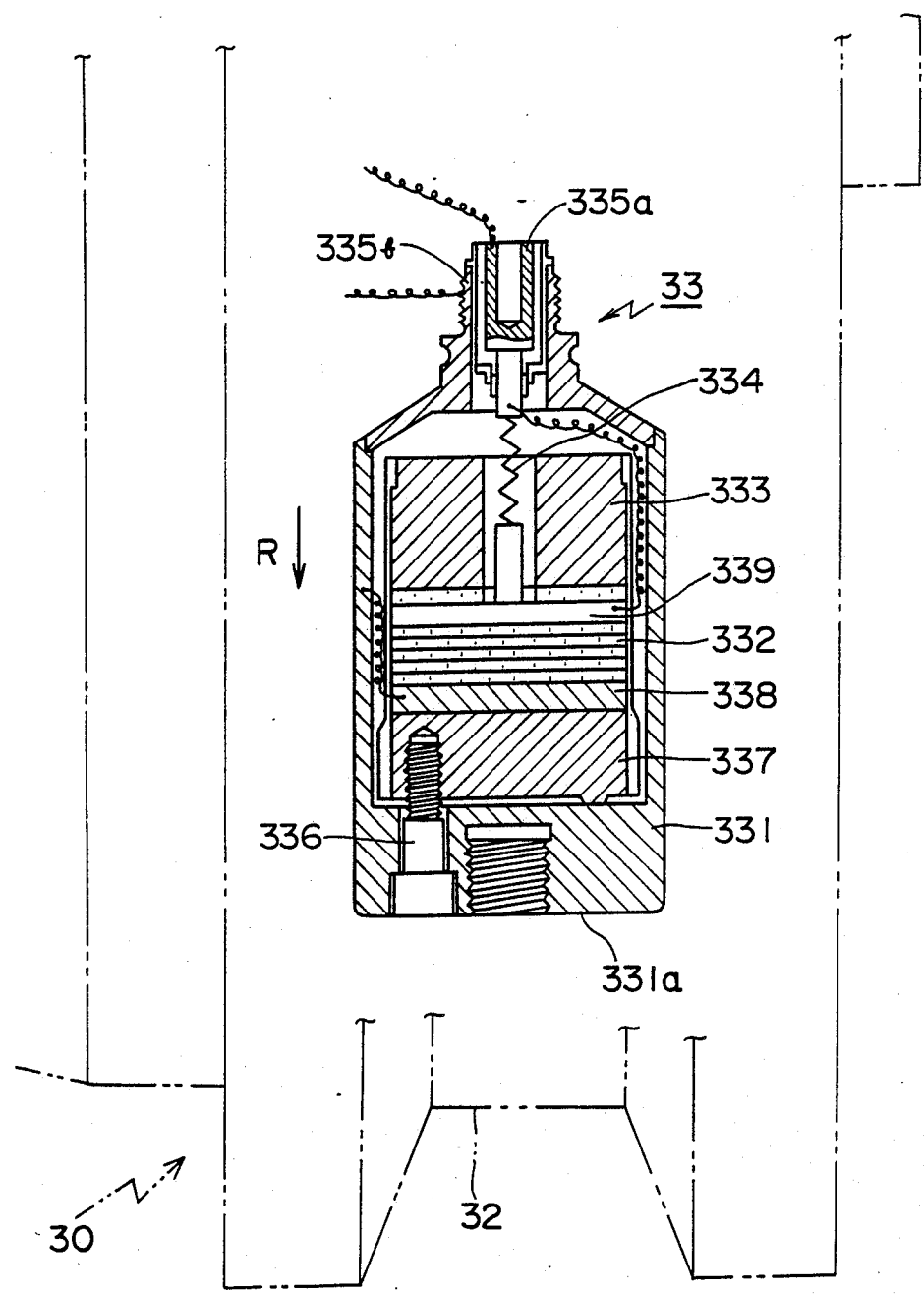
FIG. 3 is a sectional view of an acceleration sensor used in the tool holder.

The acceleration sensor 33 has a housing 331 secured to the body 31 as shown in FIG. 3, and a layer of five crystal disks 332 for converting a pressure reading to a voltage signal are provided in the housing 331. One end surface of the layer of crystal disks 332 contacts a receiving plate 338, which contacts an inclinable member secured to the housing 331 by a bolt 336. A holding plate 339 biased by a spring 334 contacts another end surface of the layer of the crystal disks 332 and a weight 333 contacts the holding plate 339. The voltage signal produced from the crystal disks 332 is output via a pair of connectors 335a, 335b. The housing 331 is secured in such a way that the bottom surface 331a of the housing 331 is located near the peripheral surface of the body 31 so that the weight 333 can be moved along the normal direction of movement of the tool holder 30. Accordingly, when the tool holder 30 is rotated, the centrifugal force along the normal direction of movement R acts on the weight 333. As a result, the crystal disks 332 are pressed by the weight 333, and thereby a voltage signal, which changes in proportion to the pressure, viz., the centrifugal force acting on the crystal disks 332, is generated from the crystal disks 332.

Figure 4:
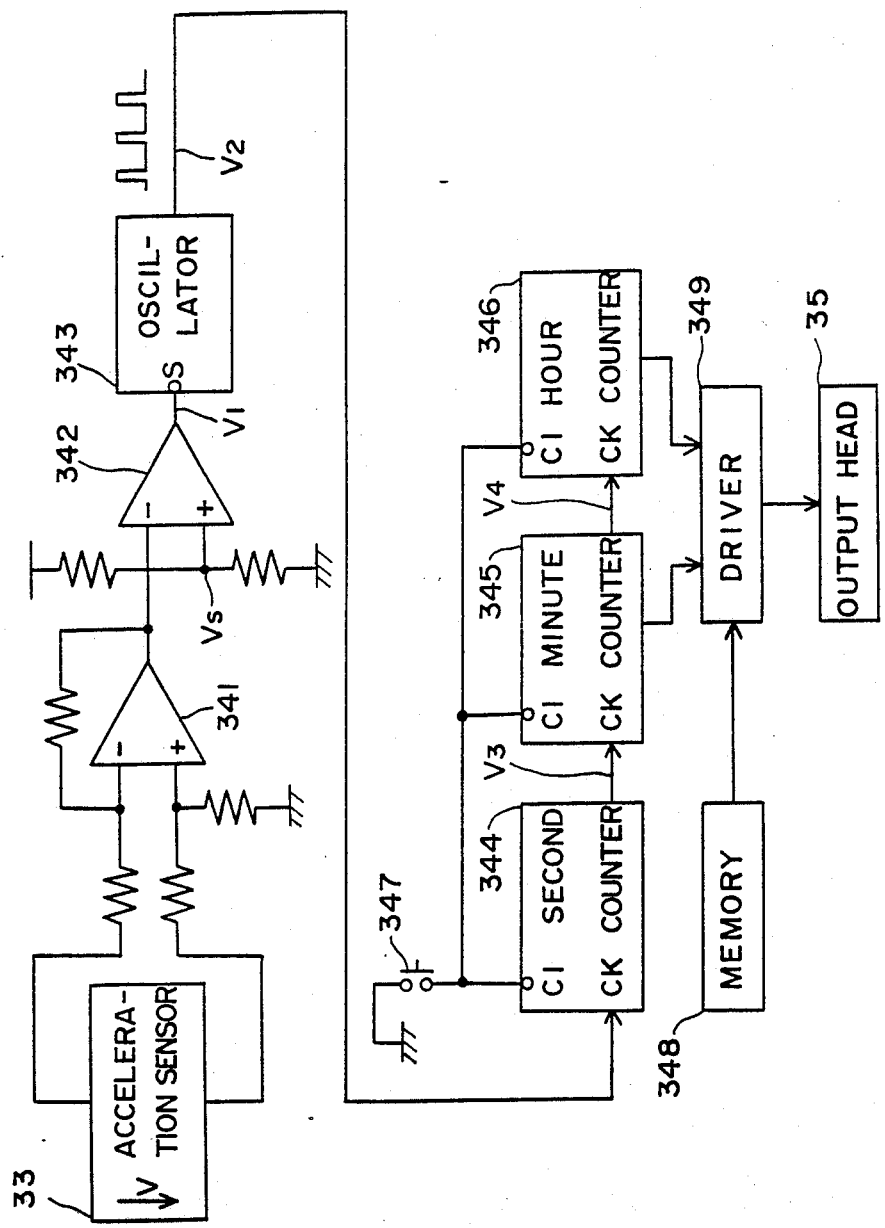
FIG. 4 is a block diagram illustrating the control circuit of the tool holder.

The voltage signal V from the acceleration sensor 33 is, as illustrated in FIG. 4, led to an amplifier 341 to amplify the voltage signal V. The output signal from the amplifier 341 is led to the inverted input terminal of a comparator 342, while a reference voltage Vs is supplied to the noninverted input terminal of the comparator 342. The reference voltage Vs is a threshold value used for determining whether or not the tool holder 30 is rotated. The reference voltage Vs is set in such a way that the output signal from the amplifier 341 becomes larger than the reference voltage Vs when the centrifugal force is detected, and the output signal from the amplifier 341 becomes smaller than the reference voltage Vs when the centrifugal force is not detected. Accordingly, the level of the output signal V1 from the comparator 342 becomes a low level when the tool holder 30 is rotated. The output signal V1 from the comparator 342 is led to the start terminal S of an oscillator 343 so that the oscillator 343 outputs pulse signals V2 having a constant periodic time to the clock terminal CK of a second counter 344 during the time when the output signal V1 is at a low level. The second counter 344 can count up to sixty seconds, and the carry signal V3 from the second counter 344 is led to the clock terminal CK of a minute counter 345. The minute counter 345 can count up to sixty minutes, and the carry signal V4 from the minute counter 345 is communicated to the clock terminal of an hour counter 346.

A push switch 347 for resetting counters 344, 345 and 346 is provided on the external surface of the body 31 so that an operator can reset the counters 344, 345 and 346 from outside tool holder 30. When the push switch 347 is temporarily pushed, the counters 344, 345 and 346 are reset to zero. This reset operation is executed whenever the tool 15 is reground or replaced.

The readings of the minute counter 345 and the hour counter 346 are output as service time to the numerical control apparatus 20 via output head 35 and readout head 17.

Figure 5:
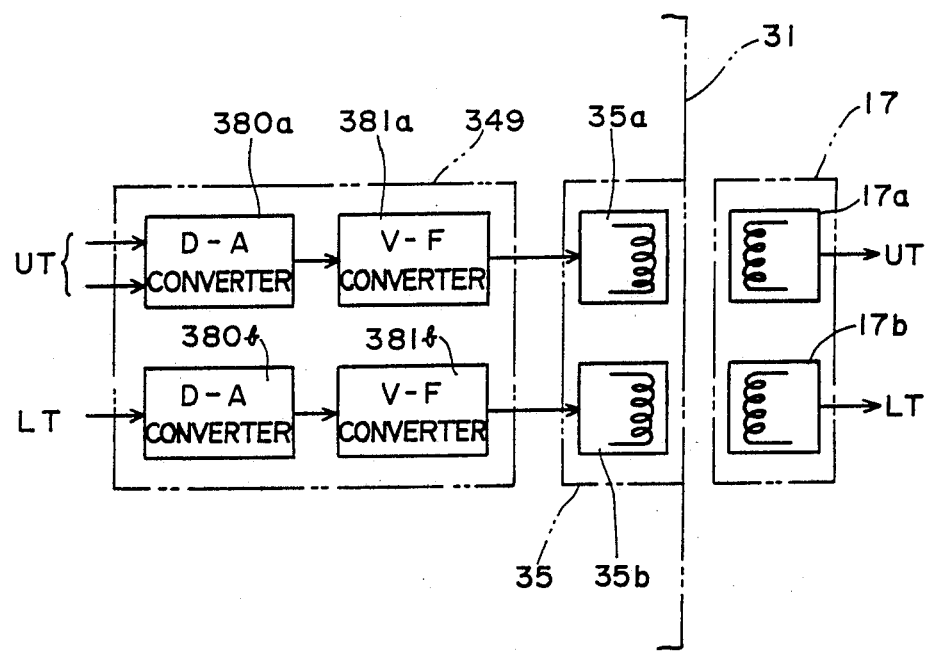
FIG. 5 is a block diagram illustrating the detailed structure of a driver, an output head and a readout head.

The output head 35 and the readout head 17 can consist of a pair of electrical connectors, which are capable of contacting each other as described in U.S. Pat. No. 4,588,339. Furthermore, the output head 35 and the readout head 17 can consist of magnetic output coils 35a, 35b and detecting coils 17a, 17b which do not contact each other, but face each other at the tool exchange position as shown in FIG. 5. In the latter case, the driver 349 includes D-A converters 380a, 380b and V-F converters 381a, 381b which convert the digital data indicating the service time UT and the lifetime LT into alternative current signals, wherein the frequency of the alternative current signals are varied in proportion to the value of the digital data. The magnetic output coils 35a, 35b are excited by the alternative current signal so that induction currents are produced from the detecting coils 17a, 17b. The induction current signals are converted to digital data indicating the service time UT and the lifetime LT in the numerical control apparatus 20.

The operation of the tool holder 30 according to the present invention will now be describe. When the tool 15 is reground, the push switch 347 is pushed by the operator, and the counters 344, 345 and 346 are thereby reset to zero.

In the machining operation, the tool holder 30 holding tool 15 is selected from the tool magazine 14 and is attached to the spindle 11 by the automatic tool change apparatus 13 when a tool exchange command in a numerical control program is read out. Subsequently, when machining commands are given by the numerical control program, the spindle 11 is rotated, and then machining operations according to the machining commands are executed. As a result, the acceleration sensor 33 detects the centrifugal force, and the output signal V1 from the comparator 342 is of a low level. When the output signal V1 is of such low level, the pulse signals V2 are output from the oscillator 343 and are supplied to the second counter 334 so that the pulse signals V2 are cumulatively counted by the counters 344, 345 and 346. The power for counters 344, 345 and 346 is supplied from the battery 36 shown in FIG. 2 so as to hold the count value of the counters 344, 345 and 346 until the push switch 347 is pushed. Accordingly, counters 344, 345 and 346 count time during the time when the detected centrifugal force exceeds the predetermined value and hold the cumulative time as the service time. The data of present service time is output to output head 35 via the driver 349 so that the service time can be read out from the output head 35.

Furthermore, the lifetime LT of the tool (i.e. time limit on using tool without being reground) is previously stored in a memory 348, and the data of the lifetime LT is also output to output head 35 via the driver 347 to be read out.

Figure 6:
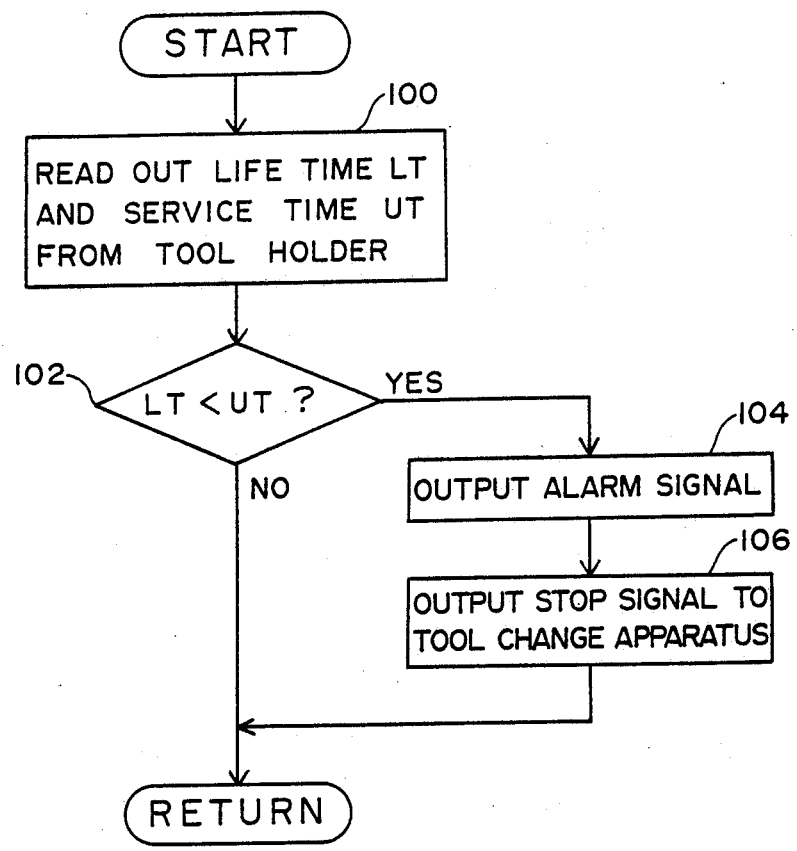
FIG. 6 is a flow chart illustrating a tool life determining process executed by a CPU in a numerical control apparatus.

Usage of the tool holder 30 according to the present invention will now be described. FIG. 6 is a flow chart illustrating a process executed by a CPU 22 in the numerical control apparatus 20. When the designated tool is indexed to the tool exchange position according to a tool exchange command, the process shown in FIG. 6 is executed. At a step 100, the lifetime LT and the present service time UT are read from the output head 35 of the tool holder 30. After that, it is determined whether not the service time UT is longer than the lifetime LT at a step 102. If the service time UT is shorter than the lifetime LT, the process shown in FIG. 6 is finished, and then, the operation of the automatic tool change apparatus 13 is started to transfer the designated tool to the spindle 11.

On the other hand, if it is detected that the service time UT is longer than the lifetime LT, an alarm signal indicating that the service time UT has exceeded the lifetime LT is output at a step 104, and then a stop signal is output to the automatic tool change apparatus 13 at a step 106 in order to stop the execution of the tool change operation.

In the embodiment described above, the rotation of the tool holder 30 is detected to determine whether or not the tool is used for machining. However, it is possible to determine whether or not the tool is used by a different procedure. Namely, the pressure acting to the tool 15 during the machining operation is detected by a strain sensor, which is attached to the body 31, and the use of the tool is detected based on the output signal of the strain sensor.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. A tool holder holding a tool and replaceably attached to a main spindle of a machine tool, said tool holder comprising:
    a body holding said tool;
    sensor means provided in said body for detecting whether or not said tool is used in a machining operation;
    counter means provided in said body for counting time cumulatively during the time when the output signal from said sensor means indicates that said tool is used, and for storing said cumulatively counted time as service time;
    output means provided in said body for outputting said service time held in said counter means to an outside circuit; and
    reset switch means provided on said body for resetting said counter means, whereby said counter means may be reset when said tool is reground or replaced.

2. A tool holder as set forth in claim 1, wherein said sensor means comprises:
    an acceleration sensor provided in said body for detecting centrifugal force acting to said body which occurs due to the rotation of said tool; and
    an electrical circuit for judging whether or not said tool is used depending on the output signal of said acceleration sensor.

3. A tool holder as set forth in claim 1, wherein said sensor means comprises:
    a pressure sensor attached to said body for detecting a machining reaction reaction force acting on said body; and
    an electrical circuit for judging whether or not said tool is used depending on the output signal of said pressure sensor.

4. A tool holder as set forth in claim 1, further comprising memory means provided in said body for memorizing a predetermined lifetime of said tool, and said output means output said lifetime to said outside circuit as well as said service time.

* * * * *